US009836669B2

United States Patent
Abou Mahmoud et al.

(10) Patent No.: US 9,836,669 B2
(45) Date of Patent: Dec. 5, 2017

(54) GENERATING A REFERENCE DIGITAL IMAGE BASED ON AN INDICATED TIME FRAME AND SEARCHING FOR OTHER IMAGES USING THE REFERENCE DIGITAL IMAGE

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 15/049,918

(22) Filed: Feb. 22, 2016

(65) Prior Publication Data

US 2017/0243081 A1 Aug. 24, 2017

(51) Int. Cl.
*G06K 9/00* (2006.01)
*G06K 9/62* (2006.01)
(Continued)

(52) U.S. Cl.
CPC .......... *G06K 9/6215* (2013.01); *G06F 17/28* (2013.01); *G06K 9/00536* (2013.01); *G06K 9/52* (2013.01);
(Continued)

(58) Field of Classification Search
None
See application file for complete search history.

(56) References Cited

U.S. PATENT DOCUMENTS 4,276,570 A * 6/1981 Burson ................. G06T 11/00
283/69
4,839,853 A 6/1989 Deerwester et al.
(Continued)

FOREIGN PATENT DOCUMENTS

WO 2007131311 A2 11/2007

OTHER PUBLICATIONS

"See You . . . In 20 Years! Make Your Face Look Old for Free," [online] Goldfinger Applications and Luxand, Inc. © 2016, [retrieved Feb. 22, 2016], retrieved from the Internet: <http://in20years.com/>, 2 pg.
(Continued)

*Primary Examiner* — Matthew Bella
*Assistant Examiner* — Jose M Torres
(74) *Attorney, Agent, or Firm* — Cuenot, Forsythe & Kim, LLC

(57) ABSTRACT

A digital image and a text string is received. The text string can be processed to identify at least a time frame and determine whether the time frame is a future time frame or a past time frame. How at least one element of the first digital image will change or has changed during the time frame can be predicted. At least one reference digital image can be generated, the reference digital image including at least one change to the at least one element corresponding to how the at least one element will change or has changed during the time frame. The reference digital image to each of a plurality of other digital images. A correlation parameter can be assigned to each of the plurality of other digital images. A portion of the plurality of other digital images having highest correlation parameters can be output for presentation to a user.

20 Claims, 3 Drawing Sheets

(51) Int. Cl.
*G06K 9/52* (2006.01)
*G06K 9/66* (2006.01)
*G06F 17/28* (2006.01)

(52) U.S. Cl.
CPC ................ *G06K 9/62* (2013.01); *G06K 9/66* (2013.01); *G06T 2207/20076* (2013.01)

(56) References Cited

U.S. PATENT DOCUMENTS

| | | |
|---|---|---|
| 5,625,554 A | 4/1997 | Cutting et al. |
| 6,925,197 B2 | 8/2005 | Dimitrova et al. |
| 7,376,276 B2 | 5/2008 | Shniberg et al. |
| 7,979,428 B2 | 7/2011 | Miyajima et al. |
| 8,290,257 B2 * | 10/2012 | Demirli .................. A61B 5/441 382/128 |
| 8,396,264 B2 * | 3/2013 | Moriyama ........ G06F 17/30247 382/118 |
| 8,705,875 B1 | 4/2014 | Ricanek, Jr. |
| 8,782,072 B2 | 7/2014 | Bennett |

OTHER PUBLICATIONS

Uber Geek, "New Software Accurately Predicts How You Will Look When You Are 70 Years Old," [online] Wonderful Engineering © 2013, Apr. 15, 2014, [retrieved Feb. 22, 2016], retrieved from the Internet: <http://wonderfulengineering.com/new-software-accurately-predicts-how-you-will-look-when-you-are-70-years-old/>, 5 pg.

* cited by examiner

GENERATING A REFERENCE DIGITAL IMAGE BASED ON AN INDICATED TIME FRAME AND SEARCHING FOR OTHER IMAGES USING THE REFERENCE DIGITAL IMAGE

BACKGROUND

The present invention relates to information retrieval.

Information retrieval is the activity of obtaining information resources relevant to an information need from a collection of information resources. Searches can be based on metadata, text and image indexing. Automated information retrieval systems are used to facilitate searching and reduce information overload. Many universities and public libraries use information retrieval systems to provide access to books, journals and other documents. Web search engines are the most visible information retrieval applications.

SUMMARY

A method includes receiving a first digital image and receiving a text string indicating at least a time frame. The method also can include processing the text string to identify at least the time frame and determine whether the time frame is a future time frame or a past time frame. The method also can include, responsive to determining whether the time frame is the future time frame or the past time frame, predicting how at least one element of the first digital image will change or has changed during the time frame. The method also can include, responsive to predicting how the at least one element of the first digital image will change or has changed during the time frame, generating, using a processor, at least one reference digital image that is a revised version of the first digital image, the reference digital image including at least one change to the at least one element corresponding to how the at least one element will change or has changed during the time frame. The method also can include comparing the reference digital image to each of a plurality of other digital images. The method also can include, based on comparing the reference digital image to each of the plurality of other digital images, assigning a correlation parameter to each of the plurality of other digital images, each correlation parameter indicating how closely a respective other digital image matches the reference digital image. The method also can include outputting for presentation to a user a portion of the plurality of other digital images having highest correlation parameters.

A system includes a processor programmed to initiate executable operations. The executable operations include receiving a first digital image and receiving a text string indicating at least a time frame. The executable operations also can include processing the text string to identify at least the time frame and determine whether the time frame is a future time frame or a past time frame. The executable operations also can include, responsive to determining whether the time frame is the future time frame or the past time frame, predicting how at least one element of the first digital image will change or has changed during the time frame. The executable operations also can include, responsive to predicting how the at least one element of the first digital image will change or has changed during the time frame, generating at least one reference digital image that is a revised version of the first digital image, the reference digital image including at least one change to the at least one element corresponding to how the at least one element will change or has changed during the time frame. The executable operations also can include comparing the reference digital image to each of a plurality of other digital images. The executable operations also can include, based on comparing the reference digital image to each of the plurality of other digital images, assigning a correlation parameter to each of the plurality of other digital images, each correlation parameter indicating how closely a respective other digital image matches the reference digital image. The executable operations also can include outputting for presentation to a user a portion of the plurality of other digital images having highest correlation parameters.

A computer program includes a computer readable storage medium having program code stored thereon. The program code is executable by a processor to perform a method. The method includes receiving, by the processor, a first digital image and receiving a text string indicating at least a time frame. The method also can include processing, by the processor, the text string to identify at least the time frame and determine whether the time frame is a future time frame or a past time frame. The method also can include, responsive to determining whether the time frame is the future time frame or the past time frame, predicting, by the processor, how at least one element of the first digital image will change or has changed during the time frame. The method also can include, responsive to predicting how the at least one element of the first digital image will change or has changed during the time frame, generating, by the processor, at least one reference digital image that is a revised version of the first digital image, the reference digital image including at least one change to the at least one element corresponding to how the at least one element will change or has changed during the time frame. The method also can include comparing, by the processor, the reference digital image to each of a plurality of other digital images. The method also can include, based on comparing the reference digital image to each of the plurality of other digital images, assigning, by the processor, a correlation parameter to each of the plurality of other digital images, each correlation parameter indicating how closely a respective other digital image matches the reference digital image. The method also can include outputting, by the processor, for presentation to a user a portion of the plurality of other digital images having highest correlation parameters.

DETAILED DESCRIPTION

Figure 1:
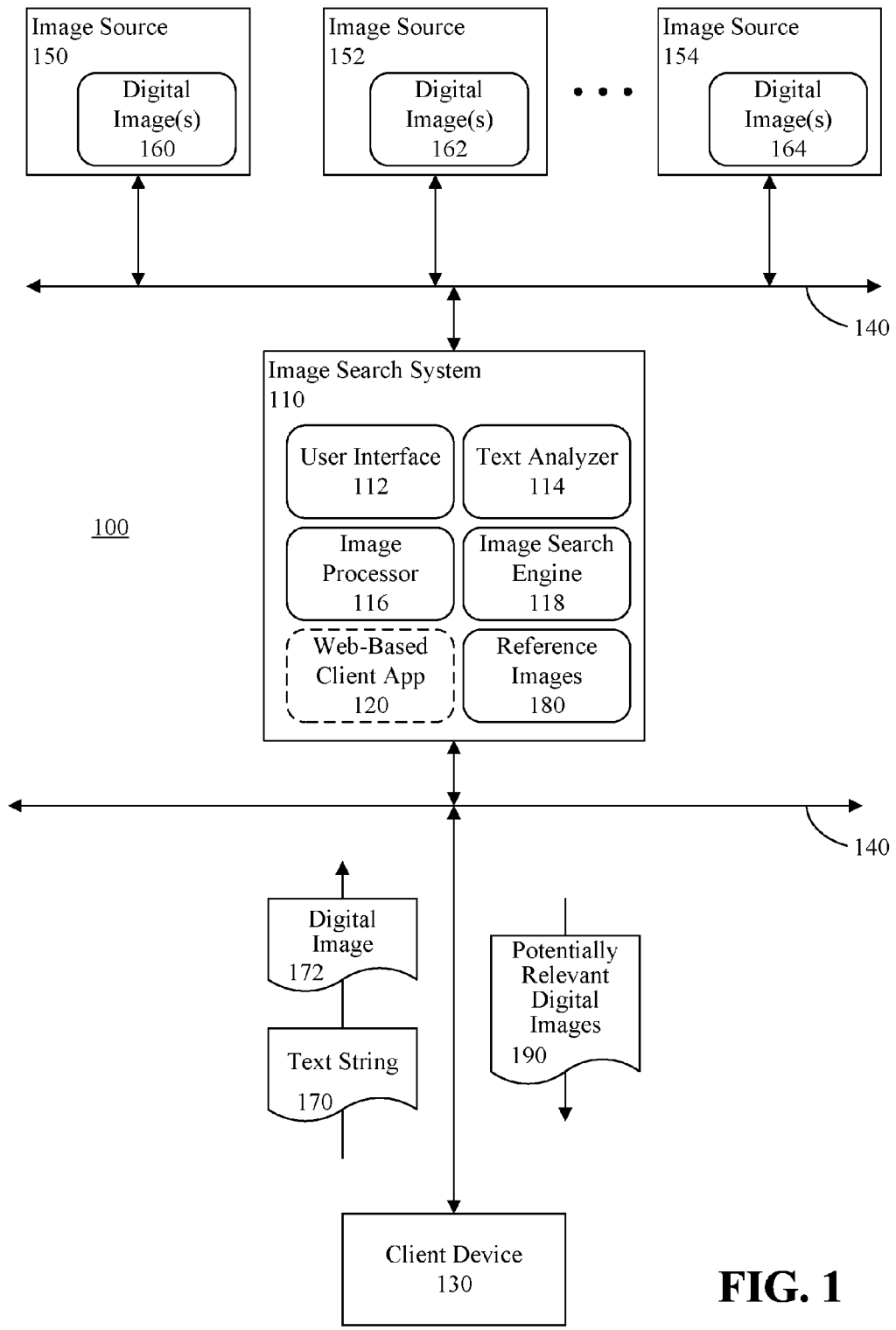
FIG. 1 is a block diagram illustrating an example of a computing environment.

This disclosure relates to information retrieval systems and, more particularly, to an image search system. The image search system can facilitate people searches using digital images and text strings indicating search criteria.

In accordance with the present arrangements, a user can communicate to an image search system a digital image and a text string including search criteria. The search criteria can be provided in a human language and can be generated using a keyboard or by performing speech recognition on spoken utterances provided by the user. For example, the user can provide a text string that states "Bella attended Boston University with me 20 years ago." The image search system can process the text string to identify search criteria. In this example, the search criteria can include the name of a person, "Bella," and a specific location, "Boston University." The search criteria also can indicate a predicate and a time frame. In this example, the text "20" can indicate the time frame. The word "attended" is a predicate that, based on the stem "ed," indicates that the time frame is in the past. The word "ago" is an adverb that also can indicate that the time frame is in the past.

Based on the predicate and the time frame, the image processing system can process the digital image to identify a person depicted in the image, and predict how visual features of that person have changed over the time frame (e.g., over the last 20 years). The image processing system can apply corresponding changes to the visual features to generate, from the digital image, a reference digital image including such changes. For example, the reference digital image can depict how the person may presently look, or how the person may have looked in the past. Using the reference digital image, the image processing system can use facial recognition to search for other digital images that may depict the person, for example more recent images or older images. The image processing system can determine a level of correlation of each of the other images to the reference digital images, and output for presentation to the user the other images having the highest levels of correlation.

Several definitions that apply throughout this document now will be presented.

As defined herein, the term "digital image" means a numeric representation (e.g., a binary representation) of an image visually depicting at least one person or a drawing visually depicting at least one person. Examples of a digital image include, but are not limited to, a vector image, a raster image and a bitmapped image. A digital image can be generated by digitally scanning a photograph or capturing the image with a digital image capture device, for example a digital camera, smart phone, or the like.

As defined herein, the term "revised version of a digital image" means a version of a digital image that has been revised by processing the digital image, using a processor, to change at least one element of the digital image.

As defined herein, the term "element of a digital image" means an item and/or feature of an image visually depicted by a digital image.

As defined herein, the term "text string" means one or more phrases, clauses and/or sentences that are written or spoken in a human language.

As defined herein, the term "human language" is a language spoken or written by human beings that is not a computer programming language. A "human language" may be referred to as a "natural language."

As defined herein, the term "predicate" means a part of a text string that expresses what is said of a subject of the text string and that consists of a verb with or without objects, complements and/or adverbial modifiers. A predicate may include a stem indicating a meaning of the predicate, for example whether the predicate infers a past time frame or a future time frame.

As defined herein, the term "stem" means a part of an inflected word that remains after the inflected part of the word is removed. A stem can serve as a canonical indicator of a predicate's meaning.

As defined herein, the term "correlation parameter" means a parameter indicating a level of correlation between a reference digital image and another digital image.

As defined herein, the term "time frame" means a period of time. A time frame can be specified as a number of months and/or years, or can be indicated using a day, week, year or month. For example, a year 1995 can indicate a time frame from the year 1995 until present. A year 2035 can indicate a time frame from the present until the year 2035.

As defined herein, the term "client device" means a processing system including at least one processor and memory that requests shared services from a server, and with which a user directly interacts. Examples of a client device include, but are not limited to, a workstation, a desktop computer, a mobile computer, a laptop computer, a netbook computer, a tablet computer, a smart phone, a personal digital assistant, a smart watch, smart glasses, a gaming device, a set-top box, a smart television, and the like. Network infrastructure, such as routers, firewalls, switches, access points, and the like, are not client devices as the term "client device" is defined herein.

As defined herein, the term "social networking system" means a system that provides social networking services, for instance via one or more websites. A social networking service is an online service platform on which social networks or social relations are built among people who, for example, share interests, activities, backgrounds or real-life connections, and via which people can share information with one another. As the term "social networking system" is defined herein, a messaging system per se (e.g., an e-mail system, a text messaging system, or an instant messaging system) is not a social networking system, though a social networking system can include an e-mail messaging system, a text messaging system and/or an instant messaging system in addition to one or more social networking components.

As defined herein, the term "natural language analysis" means a process that derives a computer understandable meaning of a human language.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

FIG. 1 is a block diagram illustrating an example of a computing environment 100. The computing environment 100 can include an image search system 110, at least one client device 130 and a plurality of image sources 150, 152, 154. The image sources 150-154 can be, for example, websites, social networking systems, public record systems, and/or the like.

The image search system 110 can be communicatively linked to the client device 130 and the plurality of image sources 150-154 via one or more communication networks 140. A communication network 140 is a medium used to provide communications links between various devices and data processing systems connected together within the computing environment 100. The communication network 140 may include connections, such as wire, wireless communication links, or fiber optic cables The communication network 140 can be implemented as, or include, any of a variety of different communication technologies such as a WAN, a LAN, a wireless network, a mobile network, a Virtual Private Network (VPN), the Internet, the Public Switched Telephone Network (PSTN), or the like.

The image search system 110 can be implemented as one or more processing systems, each including at least one processor and memory elements, and can include a user interface 112, a text analyzer 114, an image processor 116 and an image search engine 118. A user of the client device 130 can log into and interact with the image search system 110 via the user interface 112. For example, via the user interface 112, the user can, using the client device 130, upload a text string 170 and a digital image 172 to the image search system 110. The digital image 172 can be, for example, a digital scan of a photograph or an image captured with a digital image capture device, for example a digital camera, smart phone or the like. The text string 170 can be generated by the user in a human language, and include search criteria to be used by the image search system 110 to search for other digital images 160, 162, 164 correlating to the digital image, as will be described. The search criteria can indicate a name of a person depicted in the digital image 172. The search criteria also can indicate a location, such as a place, an address, a city, a county, a state, a province, a country, and/or the like where the person is known, or was known, to have lived, worked visited, etc., or where the photograph or image was captured.

Further, the search criteria can include a predicate and a time frame. The predicate and the time frame can indicate the nature of the digital image search requested by the user. For example, the predicate and time frame can indicate that the digital image 172 was captured some time ago (e.g., five years ago, ten years ago, twenty years ago, etc.), on a particular date, or within a particular week, month and/or year, and other search criteria contained in the text string 170 can indicate that the user desires to see more recent digital images 160-164 depicting a person that is depicted in the digital image 172. In another example, the search criteria contained in the text string 170 can indicate that the digital image 172 was recently captured, and the predicate and time frame can indicate that the user desires to see older digital images 160-164 depicting a person that is depicted in the digital image 172, for instance digital images captured five years ago, ten years ago, twenty years ago, etc., on a particular date, or in a particular week, month and/or year.

Responsive to receiving the text string 170, the image search system 110 can communicate the text string 170 to the text analyzer 114, which can process the text string 170, in real time, to identify the search criteria. Such processing can include identifying a name contained in the text string 170, location information, a time frame, etc. Such processing also can include, based on the predicate contained in the text string 170, determining whether the time frame indicated in the text string 170 is a future time frame or a past time frame. To identify the search criteria contained in the text string 170, the text analyzer 114 can implement natural language processing (NLP) and semantic analysis on information contained in text string 170. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the text analyzer 114 to implement NLP and semantic analysis.

The image processor 116 can receive from the image search system 110 the digital image 172 and receive from the text analyzer 114 the identified search criteria. The image processor 116 can process the digital image 172, in real time, in accordance with the search criteria to generate a reference digital image 180. For example, the image processor 116 can identify one or more elements in the digital image 172 depicting a person. Based on the predicate and time frame contained in the search criteria, the image processor 116 can process the element(s) to predict how the elements will change or have changed over the time frame. Whether the time frame is a past time frame or future time frame can be indicated by the predicate. While generating the reference digital image 180, the image processor 116 can apply such changes to the elements to depict the elements in the reference digital image 180 with the changes applied.

By way of example, in the case that an element contained in the digital image 172 is a face, the image processor 116 can process the element to determine an approximate age of the person and determine how features of the face will change, or have changed, over the time frame. Examples of such changes include, but are not limited to, shape of the face, skin texture changes, and the like. Further, the image processor 116 can determine hair color changes. Having determined such changes, the image processor 116 can apply the changes to the elements to generate the reference digital image 180. For example, the image processor 116 can depict the elements as they would have appeared a certain number of months and/or years ago, or how the elements will appear a certain number of months and/or years in the future. Prediction of how elements will change, or have changed, over a given time frame is known to those of ordinary skill in the art.

In one non-limiting arrangement, the image processor 116 can be external to the image search system 110. For example, the image search system 110 can include a web-based client application 120 configured to interface with an external image processor hosted by a remote system. In such an arrangement, the web-based client application 120 can automatically communicate the digital image 172 and criteria for processing the digital image 172 to the remote system. The remote system can process the digital image 172 in accordance with the criteria to generate the reference digital image 180. The criteria can be based on the aforementioned search criteria and can indicate how the digital image 172 is to be aged, for example to depict elements as they would have appeared a certain number of months and/or years ago, or how the elements will appear a certain number of months and/or years in the future. Responsive to generating the reference digital image 180, the remote system can communicate the reference digital image 180 to the image search system 110. For instance, the web-based client application 120 can be configured to automatically retrieve the reference digital image 180 from the remote system. An example of such a remote system is a system hosting the website http://in20 years.com. The web-based client application 120 can be configured to automatically interface with such a website.

Responsive to the reference digital image 180 being generated by the image search engine 118 or being received from a remote system, the image search engine 118 can store the reference digital image 180 to a computer readable storage medium. The image search engine 118 also can, in real time, perform facial recognition on the reference digital image 180 to generate corresponding facial recognition data. Generating facial recognition data based an image is known to those of ordinary skill in the art.

The image search engine 118 can, in real time, interface with the image sources 150-154 to retrieve a plurality of digital images 160-164 that potentially depict the same person depicted in the reference digital image 180. To retrieve the digital images 160-164, the image search engine 118 can query the image sources 150-154 using the facial recognition data and/or the identified search criteria. In illustration, the search criteria can specify a name of a person indicated in the text string 170, a location indicated in the text string 170, and/or the like. The image sources 150-154 can identify digital images 160-164 corresponding to the facial recognition data and/or search criteria, and communicate to the image search system 110 such digital images 160-164 and/or facial recognition data for each of such digital images 160-164. In the case that the image search system 110 receives the digital images 160-164 without facial recognition data, the image search engine 118 can perform facial recognition on the received digital images 160-164 to generate, for each received digital image 160-164, respective facial recognition data.

Regardless of whether the image search system 110 receives the facial recognition data for the digital images 160-164 from the image sources 150-154 or the image search system 110 generates such facial recognition data, the image search engine 118 can, in real time, compare the reference digital image 180 to the digital images 160-164 by comparing the facial recognition data corresponding to the reference digital image 180 to the facial recognition data for each of the received digital images 160-164. Moreover, the image search system 110 can assign a correlation parameter to each of the digital images 160-164. Each correlation parameter can indicate how closely a respective digital image 160-164 matches the reference digital image 180. For example, for a particular digital image 160-164, the correlation parameter assigned to that digital image 160-164 can be determined based on a level of correlation of the facial recognition data for that digital image 160-164 to the facial recognition data for the reference digital image 180.

Based on the correlation parameters assigned to the respective digital images 160-164, the image search engine 118 can, in real time, identify one or more digital images 160-164 having the highest correlation parameter(s), and select that/those digital image(s) 160-164. For example, the image search engine 118 can select the one digital image 160-164 having the highest correlation parameter. In another example, the image search engine 118 can select one, two, three, four, five, ten, fifteen, twenty, thirty, forty, fifty, etc. of the digital images 160-164 having the highest correlation parameters. In the case that the image search engine 118 has not yet received the selected digital images 160-164 from the image sources 150-154, the image search engine 118 can retrieve such digital images 160-164 from the image sources 150-154. Regardless of when the selected digital images 160-164 are retrieved, the image search engine 118 can assign a ranking to each of the selected digital images 160-164 a ranking based on the respective correlation parameter. The digital image 160-164 having the highest correlation parameter can be assigned the highest ranking, the digital image 160-164 having the next highest correlation parameter can be assigned the next highest ranking, and so on.

The image search engine 118 further can access available data for each of the selected digital images 160-164. In illustration, for each selected digital image 160-164, the image search engine 118 can, in real time, query the image source 150-154 from which the digital image 160-164 is obtained for data corresponding to the digital image 160-164, for example one or more names associated with the digital image 160-164, one or more locations associated with the digital image, etc. Such data can be associated with the digital image 160-164 in any suitable manner, for example as one or more tags applied to the digital image 160-164, as metadata applied to the digital image 160-164, or using a data record (e.g., a record in a database table that identifies the digital image 160-164 and the data).

The image search engine 118 can, in real time, output to the client device 130, for presentation to the user, the selected digital images 160-164. The image search engine 118 can output the selected digital images 160-164 via the user interface 112. In illustration, the image search engine 118 can communicate the selected digital images 160-164 to the client device 130 as potentially relevant digital images 190. The image search engine 118 can include with the potentially relevant digital images 190 the rankings and/or correlation parameters assigned to each of the selected digital images 160-164. In addition, for each of such digital images 160-164, the image search engine 118 can communicate to the client device 130 the corresponding data accessed for that digital image 160-164.

Responsive to receiving the potentially relevant digital images 190 and the corresponding data, the client device 130 can, in real time, present the potentially relevant digital images 190, along with the corresponding data, to the user of the client device 130, for example on a display. The client device 130 can indicate the ranking and/or correlation parameter assigned to each of the potentially relevant digital images 190. In one arrangement, the client device 130 can present the potentially relevant digital images 190 in an order based on the respective rankings and/or correlation parameters.

Figure 2:
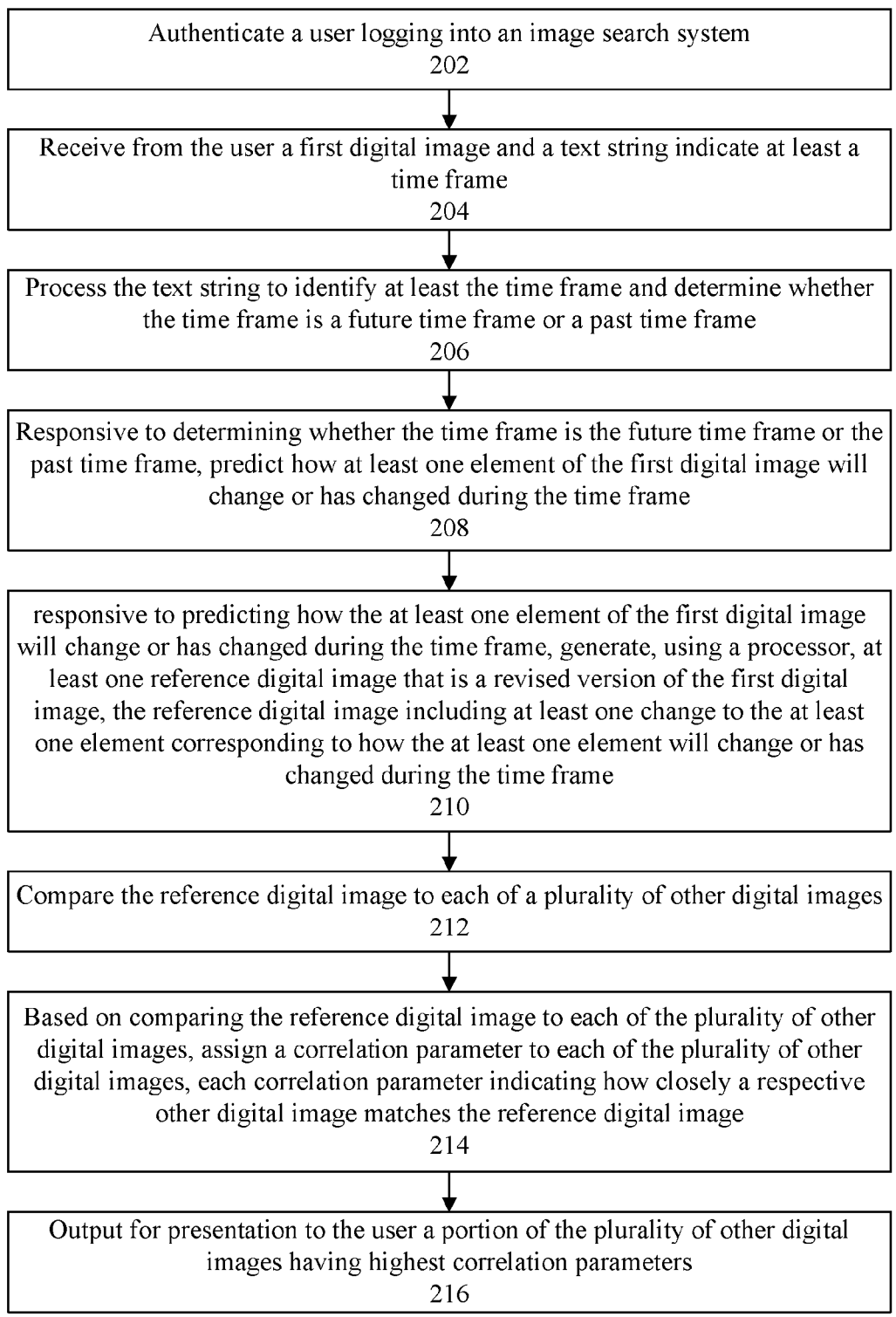
FIG. 2 is a flow chart illustrating an example of a method of ranking digital images.

FIG. 2 is a flow chart illustrating an example of a method 200 of ranking digital images. The method 200 can be implemented by the image search system 110 of FIG. 1.

At step 202, the image search system 110 can authenticate a user logging into the image search system, for example via the user interface 112. At step 204, the image search system 110 can receive, via the user interface 112, from the user a first digital image 172 and a text string 170 indicating at least a time frame. The user can communicate the first digital image 172 and the text string 170 to the image search system 110 using the client device 130.

At step 206, the text analyzer 114 can process the text string to identify at least the time frame and determine whether the time frame is a future time frame or a past time frame. At step 208, responsive to the text analyzer 114 determining whether the time frame is a future time frame or a past time frame, the image processor 116 can predict how at least one element of the first digital image 172 will change or has changed during the time frame. At step 210, responsive to the image processor 116 predicting how the at least one element of the first digital image will change or has changed during the time frame, the image processor 116 can generate, using a processor, at least one reference digital image 180 that is a revised version of the first digital image. The reference digital image 180 can include at least one change to the at least one element corresponding to how the at least one element will change or has changed during the time frame.

At step 212, the image search engine 118 can compare the reference digital image 180 to each of a plurality of other digital images 160-164. At step 214, based on comparing the reference digital image 180 to each of the plurality of other digital images 160-164, the image search engine 118 can assign a correlation parameter to each of the plurality of other digital images 160-164. Each correlation parameter can indicate how closely a respective other digital image 160-164 matches the reference digital image 180. At step 216, the image search engine 118 can output, via the user interface 112, for presentation to the user a portion of the plurality of other digital images 160-164 having highest correlation parameters. In illustration, via the user interface 112, the image search engine 118 can communicate the portion of the plurality of other digital images 160-164 having highest correlation parameters to the client device 130 for presentation to the user by the client device 130.

Figure 3:
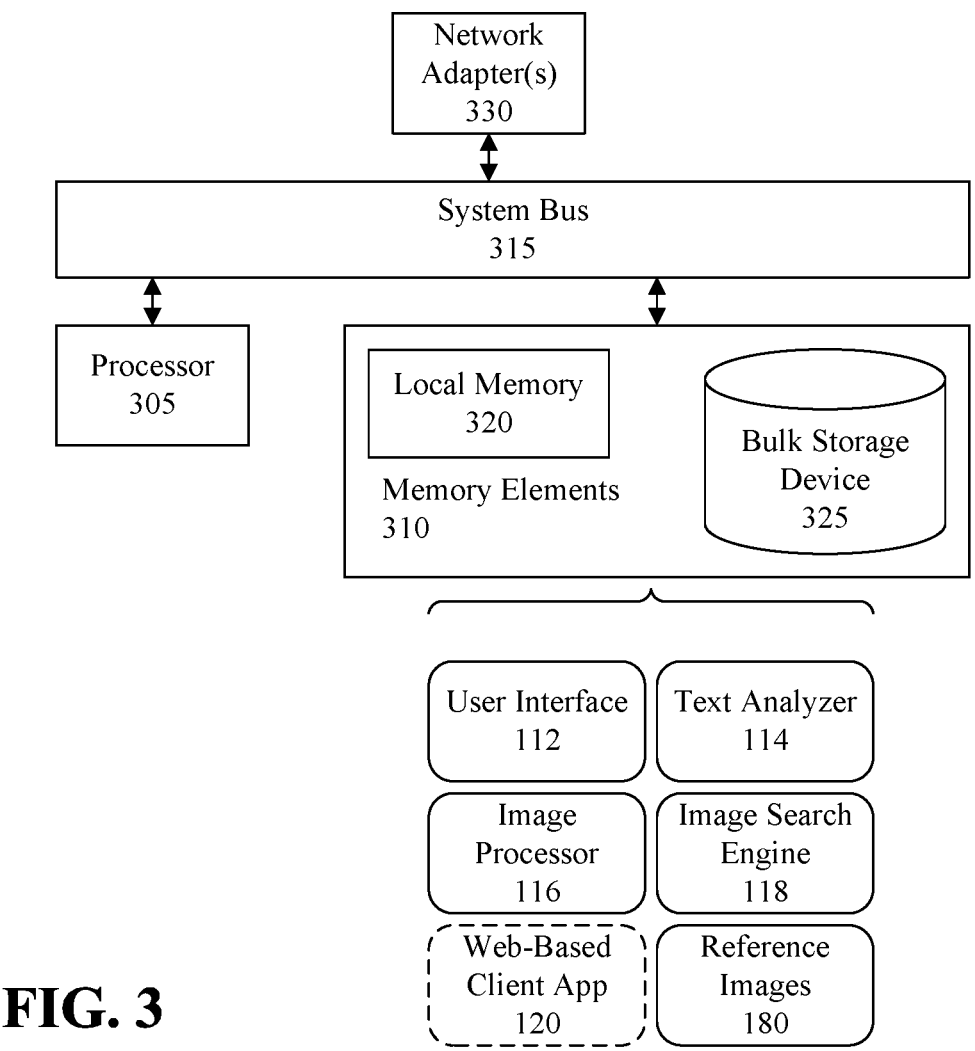
FIG. 3 is a block diagram illustrating example architecture for in image search system.

FIG. 3 is a block diagram illustrating example architecture for the image search system 110 of FIG. 1.

The image search system 110 can include at least one processor 305 (e.g., a central processing unit) coupled to memory elements 310 through a system bus 315 or other suitable circuitry. As such, the image search system 110 can store program code within the memory elements 310. The processor 305 can execute the program code accessed from the memory elements 310 via the system bus 315. It should be appreciated that the image search system 110 can be implemented in the form of any system including a processor and memory that is capable of performing the functions and/or operations described within this specification. For example, the image search system 110 can be implemented as a server, a plurality of communicatively linked servers, or the like.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The image search system 110 also can include one or more cache memories (not shown) that provide temporary storage of at least some program code in order to reduce the number of times program code must be retrieved from the bulk storage device 325 during execution.

One or more network adapters 330 also can be coupled to image search system 110 to enable the image search system 110 to become coupled to client devices, other systems, computer systems, remote printers, and/or remote storage devices through intervening private or public networks. Modems, cable modems, transceivers, and Ethernet cards are examples of different types of network adapters 330 that can be used with the image search system 110.

As pictured in FIG. 3, the memory elements 310 can store the components of the image search system 110, namely the user interface 112, the text analyzer 114, the image processor 116, the image search engine 118, and the reference digital images 180. Optionally, the memory elements 310 also can store the web-based client application 120. Being implemented in the form of executable program code, the user interface 112, text analyzer 114, image processor 116, image search engine 118, and web-based client application 120 can be executed by the image search system 110 and, as such, can be considered part of the image search system 110. The reference digital images 180 can be generated and stored by the image search system 110 and, thus, also can be considered part of the image search system 110. Moreover, the user interface 112, the text analyzer 114, the image processor 116, the image search engine 118, the web-based client application 120 and the reference digital images 180 are functional data structures that impart functionality when employed as part of the image search system 110.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving a first digital image;
    receiving a text string indicating at least a time frame;
    processing the text string to identify at least the time frame and determine whether the time frame is a future time frame or a past time frame;
    responsive to determining whether the time frame is the future time frame or the past time frame, predicting how at least one element of the first digital image will change or has changed during the time frame;
    responsive to predicting how the at least one element of the first digital image will change or has changed during the time frame, generating, using a processor, at least one reference digital image that is a revised version of the first digital image, the reference digital image including at least one change to the at least one element corresponding to how the at least one element will change or has changed during the time frame;
    comparing the reference digital image to each of a plurality of other digital images;
    based on comparing the reference digital image to each of the plurality of other digital images, assigning a correlation parameter to each of the plurality of other digital images, each correlation parameter indicating how closely a respective other digital image matches the reference digital image; and
    outputting for presentation to a user a portion of the plurality of other digital images having highest correlation parameters.

2. The method of claim 1, wherein:
    the text string further indicates a name of a person; and
    the correlation parameter is assigned to a respective other digital image is based, at least in part, on whether the other digital image is associated with the name of the person indicated in the text string.

3. The method of claim 1, wherein:
    the text string further indicates a name of a location; and
    the correlation parameter is assigned to a respective other digital image is based, at least in part, on whether the other digital image is associated with location indicated in the text string.

4. The method of claim 1, wherein processing the text string to identify at least the time frame and determine whether the time frame is a future time frame or a past time frame comprises the text string using natural language processing.

5. The method of claim 1, wherein outputting for presentation to the user the portion of the plurality of other digital images having highest correlation parameters comprises presenting the portion of the plurality of other digital images having highest correlation parameters in an order based the correlation parameters.

6. The method of claim 1, further comprising:
    assigning a ranking to each of the portion of the plurality of other digital images having highest correlation parameters;
    wherein outputting for presentation to the user the portion of the plurality of other digital images having highest correlation parameters comprises presenting the portion of the plurality of other digital images having highest correlation parameters in an order based the assigned rankings.

7. The method of claim 1, wherein the other digital images are accessed from a social networking system.

8. A system, comprising:
    a processor programmed to initiate executable operations comprising:
    receiving a first digital image;
    receiving a text string indicating at least a time frame;
    processing the text string to identify at least the time frame and determine whether the time frame is a future time frame or a past time frame;
    responsive to determining whether the time frame is the future time frame or the past time frame, predicting how at least one element of the first digital image will change or has changed during the time frame;
    responsive to predicting how the at least one element of the first digital image will change or has changed during the time frame, generating at least one reference digital image that is a revised version of the first digital image, the reference digital image including at least one change to the at least one element corresponding to how the at least one element will change or has changed during the time frame;
    comparing the reference digital image to each of a plurality of other digital images;
    based on comparing the reference digital image to each of the plurality of other digital images, assigning a correlation parameter to each of the plurality of other digital images, each correlation parameter indicating how closely a respective other digital image matches the reference digital image; and
    outputting for presentation to a user a portion of the plurality of other digital images having highest correlation parameters.

9. The system of claim 8, wherein:
    the text string further indicates a name of a person; and
    the correlation parameter is assigned to a respective other digital image is based, at least in part, on whether the other digital image is associated with the name of the person indicated in the text string.

10. The system of claim 8, wherein:
the text string further indicates a name of a location; and
the correlation parameter is assigned to a respective other digital image is based, at least in part, on whether the other digital image is associated with location indicated in the text string.

11. The system of claim 8, wherein processing the text string to identify at least the time frame and determine whether the time frame is a future time frame or a past time frame comprises the text string using natural language processing.

12. The system of claim 8, wherein outputting for presentation to the user the portion of the plurality of other digital images having highest correlation parameters comprises presenting the portion of the plurality of other digital images having highest correlation parameters in an order based the correlation parameters.

13. The system of claim 8, the executable operations further comprising:
assigning a ranking to each of the portion of the plurality of other digital images having highest correlation parameters;
wherein outputting for presentation to the user the portion of the plurality of other digital images having highest correlation parameters comprises presenting the portion of the plurality of other digital images having highest correlation parameters in an order based the assigned rankings.

14. The system of claim 8, wherein the other digital images are accessed from a social networking system.

15. A computer program product comprising a computer readable storage medium having program code stored thereon, the program code executable by a processor to perform a method comprising:
receiving, by the processor, a first digital image;
receiving, by the processor, a text string indicating at least a time frame;
processing, by the processor, the text string to identify at least the time frame and determine whether the time frame is a future time frame or a past time frame;
responsive to determining whether the time frame is the future time frame or the past time frame, predicting, by the processor, how at least one element of the first digital image will change or has changed during the time frame;
responsive to predicting how the at least one element of the first digital image will change or has changed during the time frame, generating, by the processor, at least one reference digital image that is a revised version of the first digital image, the reference digital image including at least one change to the at least one element corresponding to how the at least one element will change or has changed during the time frame;
comparing, by the processor, the reference digital image to each of a plurality of other digital images;
based on comparing the reference digital image to each of the plurality of other digital images, assigning, by the processor, a correlation parameter to each of the plurality of other digital images, each correlation parameter indicating how closely a respective other digital image matches the reference digital image; and
outputting, by the processor, for presentation to a user a portion of the plurality of other digital images having highest correlation parameters.

16. The computer program product of claim 15, wherein:
the text string further indicates a name of a person; and
the correlation parameter is assigned to a respective other digital image is based, at least in part, on whether the other digital image is associated with the name of the person indicated in the text string.

17. The computer program product of claim 15, wherein:
the text string further indicates a name of a location; and
the correlation parameter is assigned to a respective other digital image is based, at least in part, on whether the other digital image is associated with location indicated in the text string.

18. The computer program product of claim 15, wherein processing the text string to identify at least the time frame and determine whether the time frame is a future time frame or a past time frame comprises the text string using natural language processing.

19. The computer program product of claim 15, wherein outputting for presentation to the user the portion of the plurality of other digital images having highest correlation parameters comprises presenting the portion of the plurality of other digital images having highest correlation parameters in an order based the correlation parameters.

20. The computer program product of claim 15, the method further comprising:
assigning a ranking to each of the portion of the plurality of other digital images having highest correlation parameters;
wherein outputting for presentation to the user the portion of the plurality of other digital images having highest correlation parameters comprises presenting the portion of the plurality of other digital images having highest correlation parameters in an order based the assigned rankings.

* * * * *